(12) United States Patent
Deguchi et al.

(10) Patent No.: US 6,549,835 B2
(45) Date of Patent: Apr. 15, 2003

(54) APPARATUS FOR AND METHOD OF STEERING VEHICLE

(75) Inventors: Yoshitaka Deguchi, Yokohama (JP); Takeaki Obata, Yokohama (JP)

(73) Assignee: Nissan Motor Co., Ltd., Kanagawa (JP)

(*) Notice: Subject to any disclaimer, the term of this patent is extended or adjusted under 35 U.S.C. 154(b) by 6 days.

(21) Appl. No.: 09/963,568

(22) Filed: Sep. 27, 2001

(65) Prior Publication Data

US 2002/0038171 A1 Mar. 28, 2002

(30) Foreign Application Priority Data

Sep. 28, 2000 (JP) ......................................... 2000-297313

(51) Int. Cl.[7] .............................. B60T 8/32; B62D 5/00
(52) U.S. Cl. ........................ 701/41; 180/204; 180/408; 180/411; 180/421
(58) Field of Search ...................... 701/41, 42; 180/204, 180/6.2, 408, 410, 411, 421, 445

(56) References Cited

U.S. PATENT DOCUMENTS 5,816,669 A * 10/1998 Hiwatashi et al. .......... 303/140
6,073,067 A * 6/2000 Fujiwara et al. ............. 701/41

FOREIGN PATENT DOCUMENTS

JP          08-091238          4/1996

* cited by examiner

*Primary Examiner*—Thomas G. Black
*Assistant Examiner*—Arthur D. Donnelly
(74) *Attorney, Agent, or Firm*—McDermott, Will & Emery

(57) ABSTRACT

Unless the steering operation quantity detected by a steering quantity detection unit indicates that the vehicle is advancing almost rectilinearly, an approach disallowed area present toward the outer side of the turning vehicle relative to the front of the vehicle along the advancing direction, such as a road boundary, a blocking wall or a white line, is detected by an approach disallowed area detection unit. A mode judging unit judges that a steering angle limit mode is set if an approach disallowed area has been detected. An α calculating unit calculates an angle α formed by the orientation of the approach disallowed area boundary and the orientation of the vehicle. In the steering angle limit mode, a target front steering angle calculating unit performs an arithmetic operation by imposing a limit on the absolute value of the target steering angle for the front of the vehicle along the advancing direction so as to ensure that the absolute value does not exceed the maximum value of approximately α.

16 Claims, 12 Drawing Sheets

APPARATUS FOR AND METHOD OF STEERING VEHICLE

BACKGROUND OF THE INVENTION

1. Field of the Invention

The present invention relates to a vehicle steering apparatus having a front/rear wheel (four wheel) steering function and a vehicle steering method.

2. Description of the Related Art

The four-wheel steering apparatus disclosed in Japanese Laid-Open Patent Publication No. H 8-91238 is an example of the prior art technology that facilitates maneuvering a vehicle traveling at low speed such as when the driver is attempting parallel parking. This four-wheel steering apparatus calculates a target rear wheel steering angle based upon the yaw rate, the handle angle and the like and automatically steers the rear wheels in correspondence to the calculated target rear wheel steering angle. In order to facilitate the vehicle maneuver, the rear wheels are steered freely to an intended steering angle by driving the motor regardless of the current target rear wheel steering angle by operating the right-turn switch or the left-turn switch when the vehicle is traveling at very low speed.

SUMMARY OF THE INVENTION

However, the four-wheel steering apparatus in the prior art, which requires a switch operation to be performed concurrently during a steering operation, necessitates a complicated driving operation to maneuver the vehicle traveling at low speed. The driving operation may be simplified by adopting an apparatus that steers the rear wheels by interlocking them with the front wheels. However, even when such an apparatus is employed, the vehicle maneuver is not always facilitated when the vehicle is traveling at low speed. The following is an explanation of the problems of the apparatuses described above, given in reference to simulation results.

FIGS. 12 and 13 present related art examples of the results of situations in which the driver parallel parks the vehicle while traveling forward. Rear wheels 2, which are made to interlock with front wheels 1, are steered in the reverse phase to a degree that is 0.5 times the steering quantity of the front wheels 1. The reverse phase in this context refers to turning the rear wheels to the left when the front wheels are turned to the right, for instance. FIG. 12 presents the simulation results of a steering operation performed by the driver attempting to park the vehicle parallel to a wall. As shown in the figure, the position at which the vehicle stops is set apart from the wall, and thus, the vehicle is not parked in close proximity to the wall.

FIG. 13 presents simulation results of a steering operation performed by the driver by paying closer attention to the front end and the side surface of the vehicle so that the vehicle is stopped in closer proximity to the wall. In this case, while the front end of the vehicle is positioned close to the wall, the rear end cannot easily be brought close to the wall. In other words, the four-wheel steering apparatus in the related art does not address the difficulty presented when parallel parking the vehicle in close proximity to the wall.

FIG. 14 presents a related art example of the results of a simulation of a situation in which the vehicle advances into a narrow passage. As explained above, the rear wheels 2 interlocked with the steering quantity of the front wheels 1 are steered in the reverse phase to a degree 0.5 times the steering quantity of the front wheels 1. In this case, the vehicle must be advanced forward by setting the outer front end of the vehicle further beyond the entrance to the narrow passage (above the entrance to the narrow passage in FIG. 14) and thus, there is a problem in that it is difficult for the driver to adjust the degree to which the outer end of the vehicle front is set further beyond the entrance.

An object of the present invention is to provide a vehicle steering apparatus and a vehicle steering method that facilitate parallel parking while assuring that there is a correct distance between the vehicle traveling forward and a blocking wall and allow the vehicle to drive into a narrow passage with ease without necessitating a complicated operation.

The vehicle steering apparatus according to the present invention comprises an approach disallowed area detection device that detects an approach disallowed area present toward the outside of the turning vehicle relative to the direction in which the vehicle advances, an $\alpha$ calculating device that calculates an angle $\alpha$ formed by the orientation of the boundary of the approach disallowed area detected by the approach disallowed area detection device and the orientation of the vehicle and a steering angle control device that sustains a front steering angle for wheels at the front side of the vehicle at a predetermined value equal to or lower than $\alpha$ and implements control on a rear steering angle for wheels at the rear side of the vehicle if the front steering angle exceeds the angle $\alpha$ calculated by the a calculating device.

In the vehicle steering method according to the present invention, an approach disallowed area present toward the outside of the turning vehicle relative to the direction in which the vehicle is advancing is detected, an angle $\alpha$ formed by the orientation of the boundary of the approach disallowed area thus detected and the orientation of the vehicle is calculated, and the front steering angle for wheels at the front side of the vehicle is sustained at a predetermined value equal to or lower than $\alpha$ and control is implemented on the rear steering angle for wheels at the rear side of the vehicle is advancing if the front steering angle exceeds the calculated angle $\alpha$.

DETAILED DESCRIPTION OF THE PREFERRED EMBODIMENTS

Figure 11:
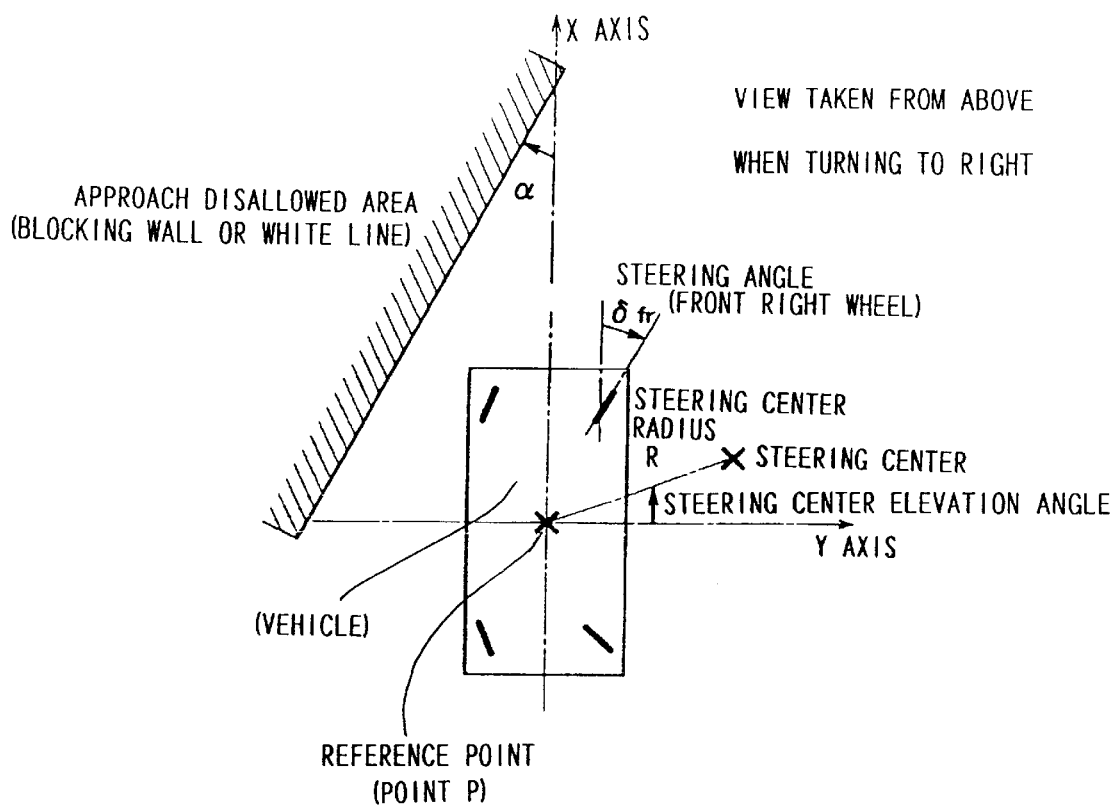
FIG. 11 illustrates the definitions of terms.

First, the definitions of the terms used in the specification are clarified by referring to FIG. 11.

Vehicle reference point P: a coordinate origin point on the vehicle. While the reference point may be assumed at any position on the vehicle, the point at which the line segment connecting the point at which the front axle is divided into two equal portions and the point at which the rear axle is divided into two equal portions is divided into two equal portions is normally selected as the reference point P to facilitate the calculation process. The center of gravity of the vehicle may be used as the reference point instead.

Vehicle fixed coordinates: a coordinate system having the origin point, the x axis and the y axis fixed in correspondence to the particulars of the vehicle, as shown in FIG. 11. In the following explanation, the reference point P on the vehicle represents the origin point, the x axis represents the front direction of the vehicle and the y axis represents the lateral direction of the vehicle, as illustrated in FIG. 11. When the vehicle is turning, the y axis assumes positive values along the direction toward the inside of the turn. As the vehicle is turned to the right in FIG. 11, positive values are taken along the right side. When the vehicle is turned to the left, however, positive values are taken along the left side.

Steering angle: the angle formed by the x axis and a wheel ($\delta$ fr in the figure indicates the steering angle of the front right wheel). The positive range represents steering to the right.

Steering center: the point on the vehicle fixed coordinates that represents the center of the turn when the vehicle is turned while the front and rear wheel steering angles remain constant.

Steering center radius: the distance between the reference point P on the vehicle and the steering center.

Steering center elevation angle: the angle formed by the line connecting the reference point P on the vehicle and the steering center relative to the y axis. Angles of rotation along the direction in which the vehicle advances are represented over the positive range. When the vehicle is turned to the right, the counterclockwise direction corresponds to the positive direction, whereas when the vehicle is turned to the left, the clockwise direction corresponds to the positive direction.

Angle $\alpha$ formed by the approach disallowed area boundary and the vehicle orientation: the angle of the approach disallowed area boundary (a blocking wall or a white line) relative to the x axis. When the vehicle is turned to the right, the clockwise direction corresponds to the positive direction, whereas when the vehicle is turned to the left, the counterclockwise direction corresponds to the positive direction.

The following is a detailed explanation of embodiments of the present invention, given in reference to the drawings.

First Embodiment

Figure 1:
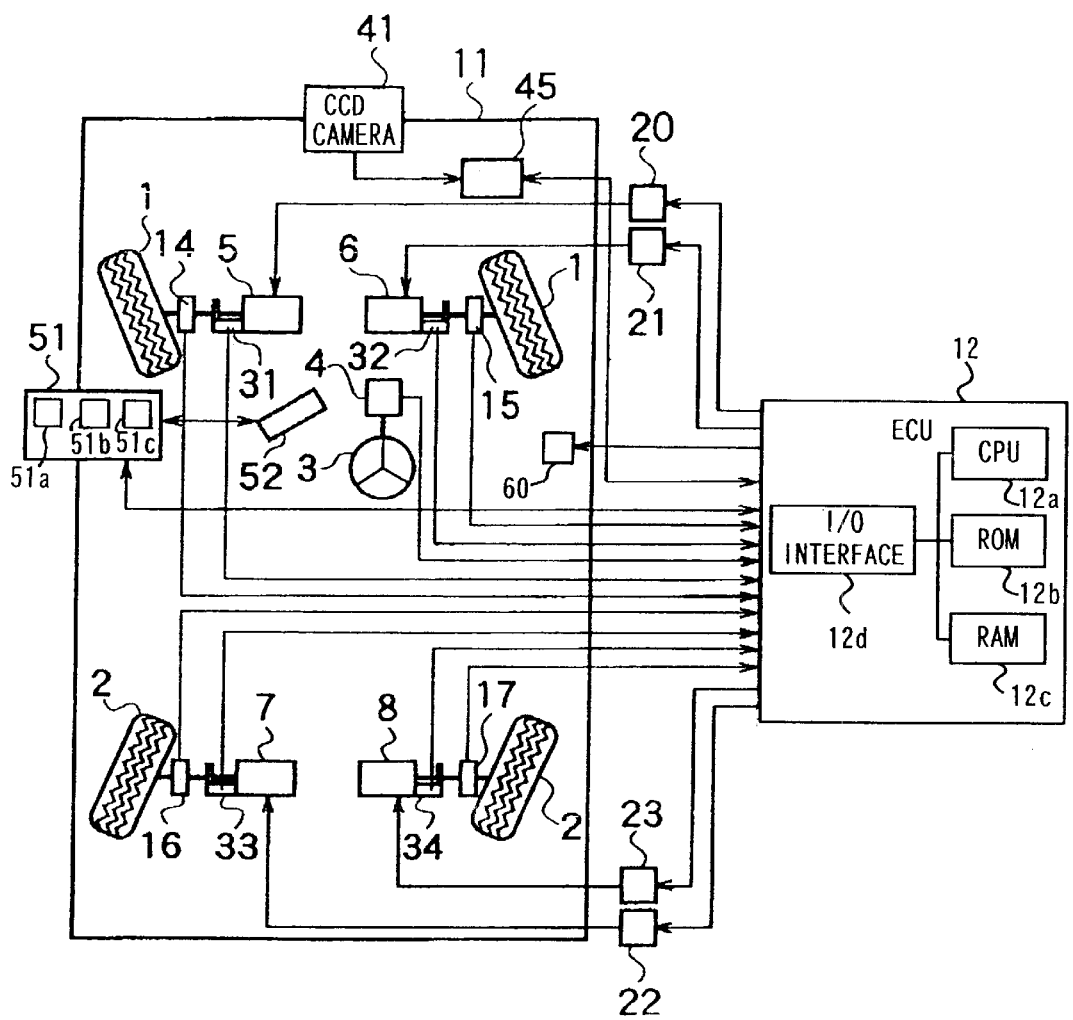
FIG. 1 is a system block diagram of a vehicle adopting the steering apparatus according to the present invention in a first embodiment.

FIG. 1 is a system configuration diagram illustrating the structure of a vehicle that adopts the first embodiment of the vehicle steering apparatus according to the present invention. In FIG. 1, a vehicle 11 includes front wheels 1, rear wheels 2, a steering wheel 3 that is operated by the driver and a steering angle sensor 4 that detects the steering angle ST of the steering wheel 3. The steering wheel 3 may be steered up to 180° to the left and the right, for instance. It is to be noted that a motor that generates a reactive force in response to a steering operation by the driver may be included to generate a reactive force in the opposite direction when the driver attempts to steer beyond 180° to the left or the right, for instance. In this embodiment, the steering quantity of the vehicle advancing straight ahead is set at 0 for reference, the steering quantities of the vehicle turned to the right are expressed as positive values and the steering quantities of the vehicle turned to the left are expressed as negative values. The range of the value that may be assumed for the steering quantity is −180°~180°.

The steering angle sensor 4 detects the degree to which a steering column shaft is rotated and the direction along which it is rotated, i.e., the quantity of the steering operation performed by the driver, by utilizing, for instance, an optical rotary encoder. The detection value is provided to a control device (hereafter referred to as an ECU) 12.

Wheel steering actuators 5 and 6 respectively provided to steer the left front wheel 1 and the right front wheel 1 and rear wheel steering actuators 7 and 8 respectively provided to steer the left rear wheel 2 and the right rear wheel 2, each having a DC motor, adjust the steering angles of the front and rear wheels at the left and the right. The steering angle adjustment is achieved by converting the rotating motion of the motor to a lateral motion of a steering rack via a worm gear and adjusting the distance over which the steering rack travels. Motors other than DC motors may be used. For instance, induction motors or switched reluctance motors maybe employed, or linear motors that allow the distances over which the steering racks travel to be directly adjusted may be used.

Drive circuits 20, 21, 22 and 23 respectively implement drive control on the steering actuators 5, 6, 7 and 8 in conformance to steering angle command values provided by the ECU 12, to drive the motors for steering the individual wheels. The drive circuits 20, 21, 22 and 23 each constituted of an H bridge, which is ideal for achieving reversible rotation rate control on a motor, implement a DC motor current feedback. Thus, the motor currents can be controlled as commanded by the ECU 12, as detailed later.

Potentio-type rack stroke sensors 31, 32, 33 and 34 respectively detect the steering rack traveling distances corresponding to the front and rear wheels at the left and the right. Vehicle speed sensors 14, 15, 16 and 17 detect the rotating speeds of the individual wheels of the vehicle 11. The vehicle speed sensors 14~17 may each be constituted of a Hall IC type sensor that outputs a pulse when a wheel shifts its position from a groove to a tooth as a gear mounted at the rotating shaft of the wheel rotates.

A CCD camera 41 provided facing forward at the front of the vehicle 11 obtains an image of an area ahead of the advancing vehicle. An image processing device 45 performs an image processing arithmetic operation such as edge processing on the image obtained by the CCD camera 41. This makes it possible to identify an approach disallowed area such as a road boundary, a blocking wall or a white line. It is to be noted that the approach disallowed area includes a guardrail, a hedge, a curb at a roadside and a boundary of a paved area. The results of the arithmetic operation performed by the image processing device 45 are transmitted to the ECU 12 to be explained later through a control signal line.

A navigation device 51 is a navigation system comprising a GPS receiver 51a, a gyro 51b and a memory 51c in which a road map is stored. The current position of the vehicle is detected by the GPS receiver 51a and, at the same time, the direction in which the vehicle is advancing is ascertained by the gyro 51b. The information with regard to the current vehicle position and the vehicle advancing direction is displayed at a touch-panel navigation screen 52 together with the map information stored in the memory 51c of the navigation device 51. The navigation device 51 is internally provided with a RAM in which the current vehicle position information, the vehicle advancing direction information and the like are stored, and the contents of the information in the RAM can be read out in response to a command issued by the ECU 12.

The ECU 12 provided with a control circuit, the main component of which is a microcomputer having a CPU 12a, a ROM 12b, a RAM 12c and an I/O interface 12d, engages in signal exchange with an external device and various arithmetic operations. The CPU 12a executes the arithmetic operations and the ROM 12b stores therein a control program, various types of data and the like to be explained later. The RAM 12c is used to temporarily store information during a program execution. The I/O interface 12d is provided to input information from the external sensors and the like and output a signal for driving the external actuators. It is to be noted that the ECU 12 also includes a timer and the like for measuring the lengths of pulse intervals detected by the vehicle speed sensors 14–17.

Figure 2:
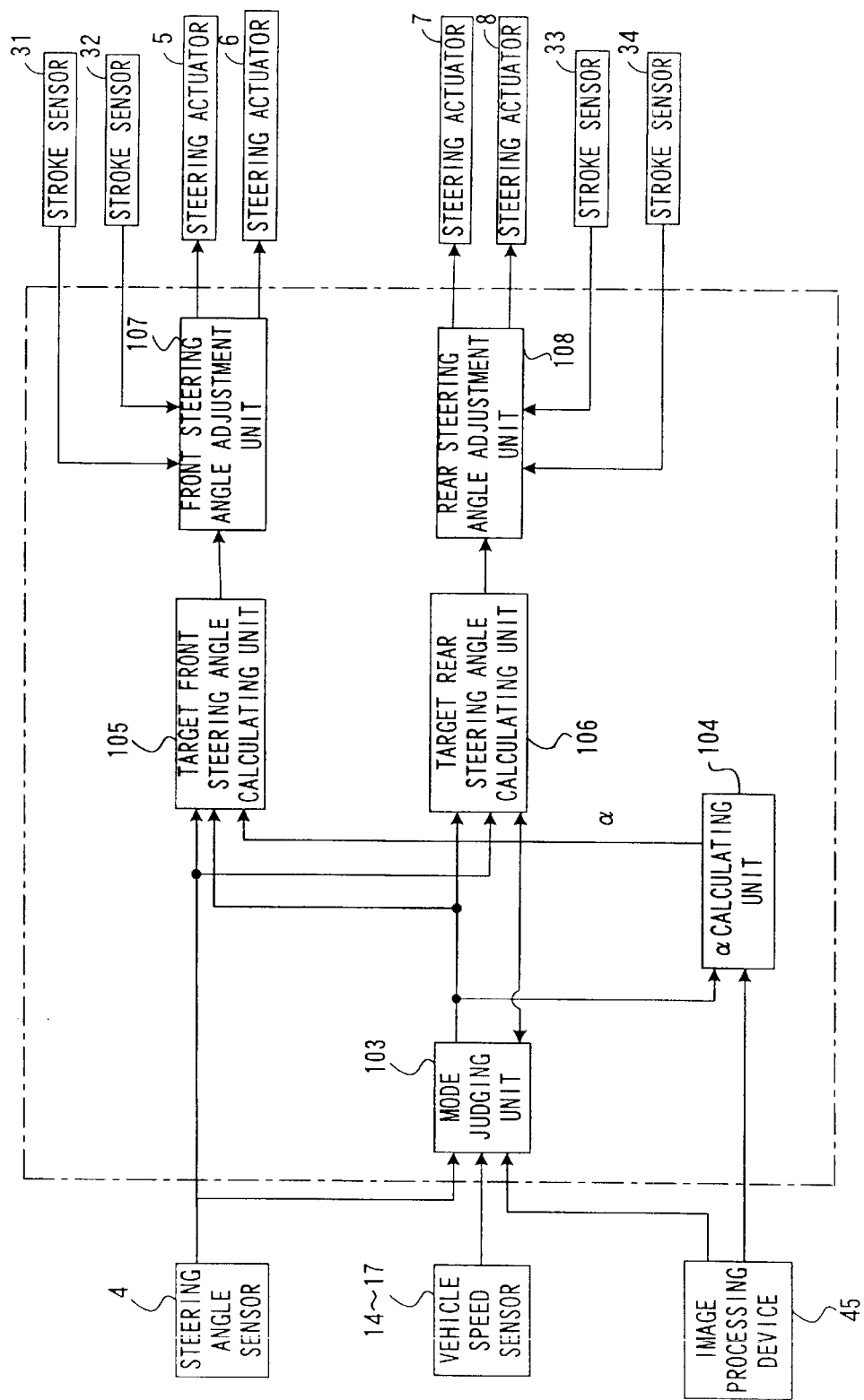
FIG. 2 is a block diagram illustrating the structure adopted in the control unit in the steering apparatus shown in FIG. 1.

FIG. 2 is a block diagram illustrating various types of arithmetic operation processing executed at the ECU 12. In FIG. 2, the ECU receives the steering quantity from the steering angle sensor 4 and also receives information indicating an approach disallowed area provided by the image processing device 45. The ECU 12 has functions achieved by a mode judging unit 103, an $\alpha$ calculating unit 104, a target front steering angle calculating unit 105, a target rear steering angle calculating unit 106, a front steering angle adjustment unit 107 and a rear steering angle adjustment unit 108.

The mode judging unit 103 makes a judgment with regard to a steering angle limit mode to be explained later when an approach disallowed area is detected. The a calculating unit 104 calculates an angle a formed by the orientation of the boundary of the detected approach disallowed area and the orientation of the vehicle. The target front steering angle calculating unit 105 calculates target steering angles for the front of the advancing vehicle based upon the detected steering operation quantity. If the mode judging unit 103 judges that the steering angle limit mode is set, the target front steering angle calculating unit 105 limits the absolute value of the target steering angles for the front of the advancing vehicle to a value substantially equal to $\alpha$. The target rear steering angle calculating unit 106 calculates target steering angles for the rear of the advancing vehicle based upon the detected steering operation quantity. The front steering angle adjustment unit 107 drives the front steering actuators 5 and 6 so as to match the actual steering angles for the front wheels 1 with the target front steering angles. The rear steering angle adjustment unit 108 drives the rear steering actuators 7 and 8 so as to match the actual steering angles for the rear wheels 2 with the target rear steering angles.

The mode judging unit 103, the $\alpha$ calculating unit 104, the target front steering angle calculating unit 105, the target rear steering angle calculating unit 106, the front steering angle adjustment unit 107 and the rear steering angle adjustment unit 108 are realized by the CPU 12a internally provided at the ECU 12 executing a program.

Figure 3:
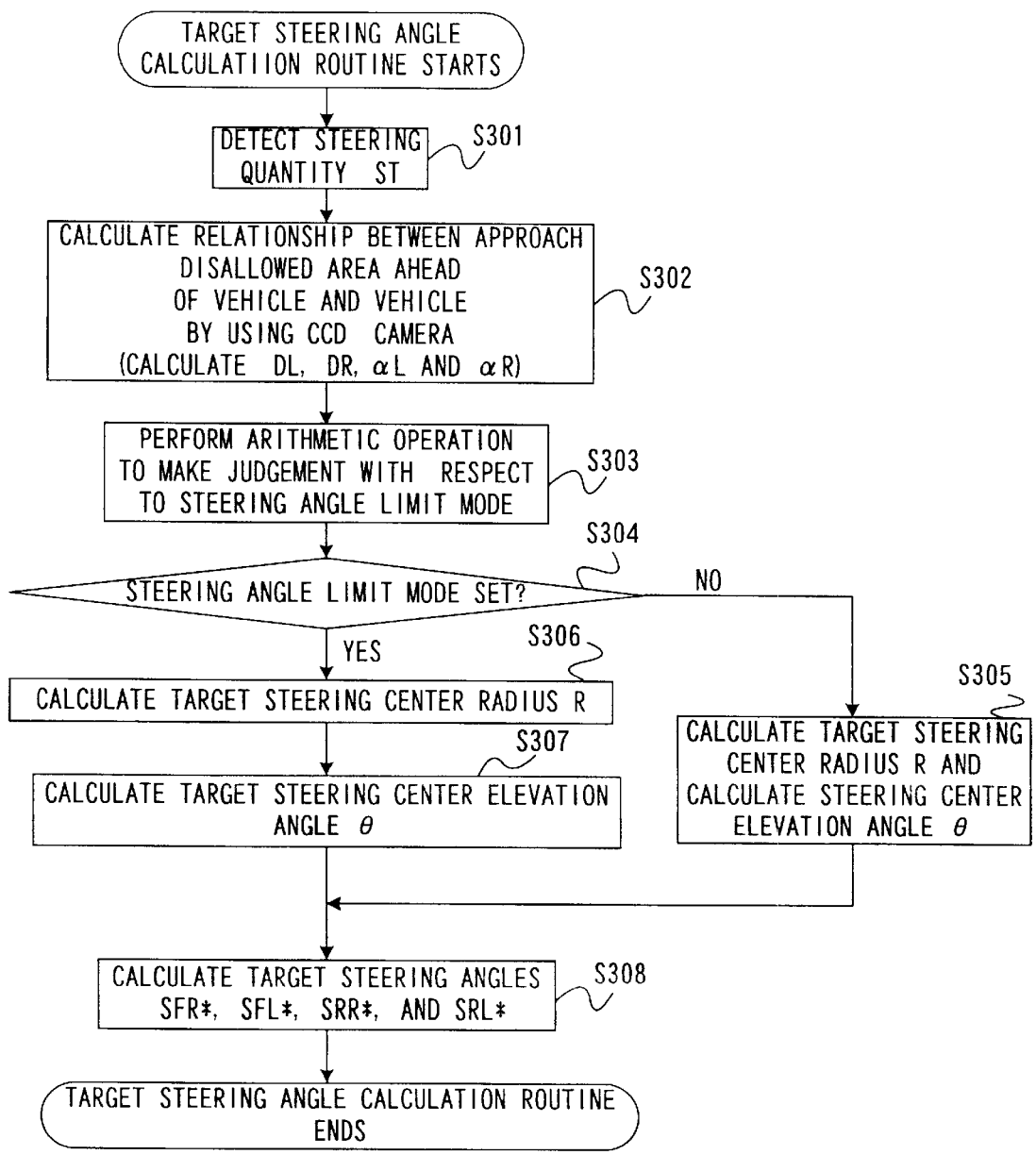
FIG. 3 is a flowchart of the control procedure implemented in the steering apparatus according to the present invention.

The following is an explanation of the operation of the vehicle steering apparatus according to the present invention achieved in the first embodiment, given in reference to the flowchart presented in FIG. 3. In step S301, the steering quantity ST is detected. The steering quantity ST is detected as the ECU 12 counts the number of encoder pulses output from the steering angle sensor 4 in correspondence to the degree to which the steering wheel 3 is rotated.

In step S302, the positional relationship between the approach disallowed area ahead of the vehicle and the vehicle is calculated. First, image data corresponding to the image of the area ahead of the vehicle are obtained by the CCD camera 41. The image processing device 45 detects the boundary, i.e., the edge, of the approach disallowed area such as a road boundary, blocking wall or a white line extending ahead of the advancing vehicle by using the image data thus obtained. The image processing device 45 calculates the distance between the boundary of the approach disallowed area thus detected and the vehicle and the angle (the angle relative to the x axis) formed by the orientation of the boundary and the vehicle.

Methods that may be adopted to detect an edge such as a white line by using image data and to measure the distance between the detected edge and the vehicle and the orientations of the edge and the vehicle include the method disclosed in "Simultaneous Assessment of Road Structure and Camera Attitude Based Upon Continuous Road Images: Electronic Information Communication Convention Publication D-2, vol. J76-D-II No.3 pp. 514–523". In this method, the distance between the detected edge and the vehicle and the orientations of the edge and the vehicle are measured while correcting any change in the camera attitude by matching the detected edge with one in a road model stored in memory in advance. Its detailed explanation is omitted in this specification.

From the data resulting from the calculation that indicate the distance between the approach disallowed area boundary and the vehicle and the orientation of the approach disallowed area boundary, a set of data indicating the smallest distances between the approach disallowed area boundary to the left and the right of the vehicle and the vehicle (one set of data indicating the distance and the orientation) is selected based upon the information indicating the distance to the vehicle.

DL represents the smallest distance between the approach disallowed area boundary to the left of the vehicle and the vehicle and aL represents the corresponding angle formed by the approach disallowed area boundary and the orientation of the vehicle. Likewise, DR represents the distance between the approach disallowed area boundary to the right of the vehicle and the vehicle and $\alpha$R represents the corresponding angle formed by the approach disallowed area boundary and the orientation of the vehicle. It is to be noted that if an approach disallowed area boundary cannot be detected, an invalid value indicating that the detection cannot be made is individually set for the values of DL, αL, DR and αR. The data indicating the values of DL, αL, DR and αR thus obtained are transmitted to the ECU 12.

Once the values of αL, αL, DR and aR are calculated, the operation proceeds to step S303. In step S303, an arithmetic operation is performed to enable a judgment as to whether or not the steering angle limit mode, in which a limit is imposed on the steering angles, are set. This arithmetic operation is performed at the ECU 12.

The steering angle limit mode is judged to be set, for instance, when the absolute value of the steering quantity ST is equal to or larger than 10° and the distance between the vehicle and the approach disallowed area boundary detected in step S302 (DL when the vehicle is turned to the right and DR when the vehicle is turned to the left) is equal to or less than substantially 0.5 m. In addition, it is judged that the steering angle limit mode has been cleared when the angle α (αL when the vehicle is turned to the right and αR when the vehicle is turned to the left) formed by the approach disallowed area boundary outside the turning vehicle and the vehicle is equal to or less than substantially 0.

If the distance between the approach disallowed area boundary outside the turning vehicle and the vehicle (DL when the vehicle is turned to the right, DR when the vehicle is turned to the left) is larger than the distance between the approach disallowed area boundary inside the turning vehicle and the vehicle (DR when the vehicle is turned to the right, DL when the vehicle is turned to the left), it is decided that the driver has no intention of setting the vehicle close to the approach disallowed area boundary at the outer side of the turning vehicle. In such a case, it is judged that the steering angle limit mode has been cleared. It is to be noted that the steering angle limit mode is cleared in the initial state.

In addition, if the vehicle speed detected by the vehicle speed sensors is equal to or higher than a predetermined vehicle speed, no limit is imposed on the front steering angles. In the embodiment, the operation is allowed to shift to the steering angle limit mode when the vehicle speed is equal to or lower than 5 Km/h, and the steering angle limit mode is cleared regardless of any other conditions under which the vehicle is traveling once the vehicle speed exceeds 8 Km/h. As a result, no limit is imposed on the steering angles during a steering operation while the vehicle is traveling at a speed equal to or higher than the predetermined vehicle speed. It is to be noted that the vehicle speed as referred to in this context is the average of the speeds detected by the vehicle speed sensors 14, 15, 16 and 17.

After the arithmetic operation for enabling a judgment with regard to the steering angle limit mode is performed in step S303, the operation proceeds to step S304. In step S304, a judgment is made as to whether or not the steering angle limit mode is set. If it is judged that the steering angle limit mode is not set, the operation proceeds to step S308 via step S305, to calculate target steering angles for the individual wheels. If, on the other hand, it is judged that the steering angle limit mode is set, the operation proceeds to step S308 via steps S306 and S307 to calculate target steering angles for the individual wheels. Sf1*, Sfr*, Srl* and Srr* respectively represent the target steering angles for the front left wheel, the front right wheel, the rear left wheel and the rear right wheel along the advancing direction. When the vehicle is provided with an automatic transmission, it is judged to be advancing forward if the shift lever of the automatic transmission is set at the forward drive position and is judged to be traveling backward if the shift lever is set at the reverse position.

If it is judged in step S304 in the flowchart presented in FIG. 3 that the steering angle limit mode is not set, the operation proceeds to step S305 to calculate a target steering center position Q. Namely, a target steering center radius R and a target steering center elevation angle θ are calculated. Reciprocals of target steering center radius R and values of target steering center elevation angles θ are stored as ROM data as shown in FIGS. 5 and 6, in correspondence to varying values of the steering quantity ST.

Figure 5:
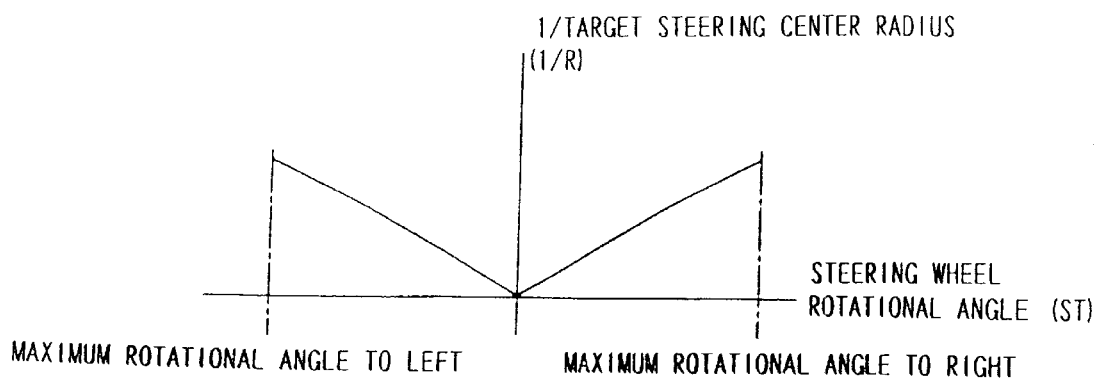
FIG. 5 illustrates the relationship between the steering quantity (rotational angle) ST and the steering center radius R.
Figure 6:
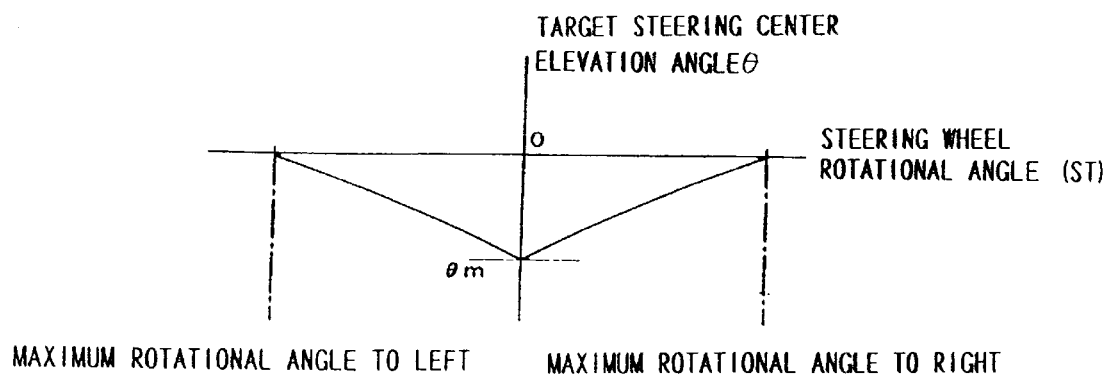
FIG. 6 illustrates the relationship between the steering quantity (rotational angle) ST and the steering center elevation angle $\theta$.

FIG. 5 illustrates the relationship between the reciprocal of the target steering center radius R and the steering quantity ST, and FIG. 6 illustrates the relationship between the target steering center elevation angle θ and the steering quantity ST. The target steering center radius R and the target steering center elevation angle θ are calculated based upon the relationship in FIG. 5 and 6 by referring the detected steering quantity ST. It is to be noted that the target steering center radius R and the target steering center elevation angle θ may be determined in correspondence to both the steering quantity ST and the vehicle speed. In this case, the reciprocal of the target steering center radius R and the target steering center elevation angle θ may correspond to the steering quantity ST and the vehicle speed.

When the target steering center radius R and the target steering center elevation angle θ are ascertained, the operation proceeds to step S308. In step S308, the target steering angles (the front left wheel: Sfl*, the front right wheel: Sfr*, the rear left wheel: Srl* and the rear right wheel: Srr*, along the advancing direction) for the individual wheels are calculated. The arithmetic operation for calculating the target steering angles is performed by utilizing steering angle maps corresponding to the individual wheels (a total of four sets) that are prepared in advance in correspondence to varying values of the target steering center radius R and varying values of the target steering center elevation angle θ.

Now, an explanation is given on how the steering angle maps for the individual wheels are made to correspond with the target steering center radius R and the target steering center elevation angle θ. The relationships between the steering angles for the individual wheels (the front left wheel Sfl, the front right wheel Sfr, the rear left wheel Srl and the rear right wheel Srr along the advancing direction) and the steering center (combination of the steering center radius value and the corresponding steering center elevation angle) are obtained through testing in advance.

In these relationships, the steering center is uniformly determined in correspondence to specific steering angles at the four wheels. However, if a given steering center is set first, the combination of the steering angles of the four wheels cannot be determined uniformly and there are a plurality of possible combinations.

Figure 7:
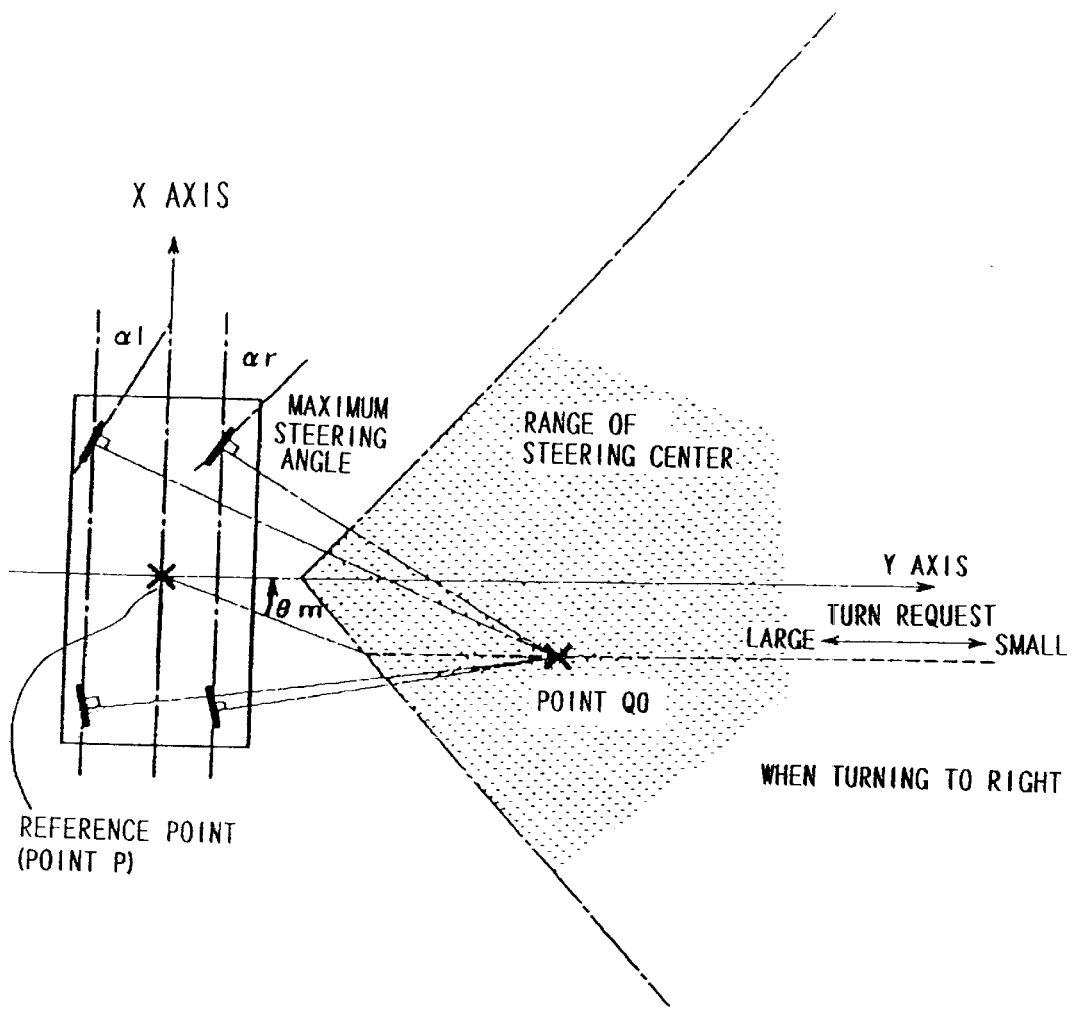
FIG. 7 illustrates an example of the steering center position that maybe assumed relative to the steering quantity (rotational angle) ST.

Accordingly the combination corresponding to the steering angles of the individual wheels set so as to allow the lines connecting the wheels and the steering center and the lines indicating the orientations of the wheels to intersect each other at a right angle, as shown in FIG. 7, is ascertained. FIG. 7 illustrates the possible range of the steering center. The target steering center is present on the dotted line in FIG. 7. The individual wheel steering angles in this combination or the individual wheel steering angles approximating the combination are made to correspond to the steering center. However, if the steering center is set away from the vehicle over a large enough distance, i.e., if the vehicle is advancing almost straight ahead, a combination that results in a toe-in state in which the stability of the vehicle advancing rectilinearly is maintained in a satisfactory manner (a state in which the front tires are turned inward relative to the direction along which the vehicle is advancing) is selected and the correspondence of the steering angles to the steering center therein is ascertained.

By setting the wheel steering angles in correspondence to the steering center, as illustrated in FIG. 7, the traveling resistance can be reduced when the vehicle is traveling at low speed and the quantity of energy required for traveling can be minimized. In addition, since the sliding angles of the individual wheels are reduced, the sliding noise is also reduced.

The steering center also changes in correspondence to the speed of the vehicle as well as in correspondence to the wheel steering angles. Accordingly, it is even more desirable to ascertain in advance the relationship between the steering center and the vehicle speed through testing, store it in memory as ROM data mentioned earlier and use the ROM data as a vehicle look-up table.

If it is judged in step S304 that the steering angle limit mode is set, the operation proceeds to step S306 to calculate the target steering center radius R. The arithmetic operation to calculate the target steering center radius R is performed by utilizing the ROM data used in the processing in step S305. When the target steering center radius R is calculated, the operation proceeds to step S307.

In step S307 the target steering center elevation angle θ is calculated. An explanation is given below in reference to FIG. 4 on a situation in which the vehicle is turned to the right. While a similar operation is performed when the vehicle is turned to the left, its explanation is omitted.

First, a target steering center elevation angle reference value θ0 (a negative value in this example) is calculated. This calculation is performed by looking up the ROM data table used in the processing in step S305. The steering center corresponding to the target steering center radius R and the target steering center elevation angle reference value θ0 is at a point Q0 in FIG. 4, i.e., the point calculated in step S305.

Next, an intersecting point Q (an intersecting point further to the right relative to the point P) is ascertained. At the point Q, the line passing through the center A2 of the wheel (the front left wheel) at the outer side of the front of the turning vehicle and extending perpendicular to the approach disallowed area boundary, i.e., the line L1 passing through the point A2 and forming an angle a with the y axis, intersects the arch of the radius R around the point P. Then, a steering center elevation angle value θth formed by the line connecting the point Q thus ascertained and the point P relative to the y axis is calculated. The calculation is performed by looking up the data table stored in the ROM. In other words, a two-dimensional map MAP_A2 of the steering center elevation angle θth made to correspond to both the value of α and the reciprocal of the target steering center radius R is obtained geometrically in conformance to the values of x2, y2 and the like shown in FIG. 4 in advance and is stored as ROM data.

The steering center elevation angle θth thus calculated is then compared with the target steering center elevation angle reference value θ0. If θth<θ0, the target steering center elevation angle θ is set at θ=θth, otherwise, it is set at θ=θ0.

The following is a more detailed explanation of the processing performed in steps S305~S308.

If the steering angle limit mode is not set, i.e., if the operation has proceeded from step S305 to step S308, the steering angles are calculated through the following formula (1) so as to ensure that reverse phase steering is achieved in correspondence to the steering quantity ST with the ratio of the target steering angles for the front wheels and the target steering angles for the rear wheels set at 2:1.

$$Sfl^*=Sfr^*=K\times ST, \ Srl^*=Srr^*=-0.5\times K\times ST \ (K \text{ is a constant}) \quad (1)$$

If the steering angle limit mode is set, i.e., if the operation has proceeded from steps S306 and S307 to step S308, a limit is imposed on the front left wheel steering angle Sfl* and the front right wheel steering angle Sfr* so as to ensure that they do not exceed α only when the absolute values of Sfl* and Sfr* in the expression (1) above exceed α.

If the absolute values of Sfl* and Sfr* calculated through formula (1) exceed α, the target steering angles for the rear wheels are corrected as indicated below in correspondence to the extent to which the absolute values exceed α.

$$Srl^*=Srr^*=-0.5\times K\times ST-0.5\times(K\times ST-\alpha) \text{ when the vehicle is turned to the right} \quad (2)$$

$$Srl^*=Srr^*=-0.5\times K\times ST+0.5\times(-K\times ST-\alpha): \text{ when the vehicle is turned to the left} \quad (3)$$

In formulae (2) and (3), the reverse phase steering angles for the rear wheels are set larger as the extent to which the absolute values exceed the limit (α) increases while a limit is imposed on the steering angles for the front wheels. Thus, even when a limit is imposed on the steering angles for the front wheels, a turn radius equal to or close to the turn radius achieved when there is no restriction can be maintained. As a result, the driver can perform a driving operation with ease. It is to be noted that while a limit is imposed on the steering angles so that they are set at a when the absolute value of the steering angle Sfl of the front left wheel along the advancing direction and the absolute value of the steering angle Sfr of the front right wheel along the advancing direction exceed α in the steering angle limit mode, the steering angles may be controlled at a predetermined value smaller than α.

When the target steering angles are calculated as described above, the ECU 12 calculates current command values to be issued to the DC motor drive circuits 20, 21, 22 and 23 to match the steering angles of the individual wheels (the front left wheel Sf1, the front right wheel Sfr, the rear left wheel Srl and the rear right wheel Srr) respectively with the target steering angles Sfl*, Sfr*, Srl* and Srr*.

The individual wheel steering angles are ascertained in correspondence to the detection values provided by the stroke sensors 31, 32, 33 and 34. Namely, the relationships between the values detected by the individual stroke sensors and the wheel steering angles are ascertained in advance through testing. The wheel steering angles are determined by looking up the table of the data thus obtained which are stored in advance in ROM. The current command values are obtained through a feedback calculation to ensure that the steering angle detection value corresponding to each wheel matches the target steering angle.

The feedback calculation may be achieved through PID control, sliding mode control, model reference control or the like. Since all these methods are well-known in the public domain, their explanation is omitted.

It is to be noted that the approach disallowed area such as a road boundary, a blocking wall or a white line obtained at the image processing device 45 may be displayed together with the current vehicle position at the navigation screen 52. In such a case, the driver who is allowed to view the approach disallowed area identified by the image processing device 45 is able to surmise the behavior of the vehicle.

When the steering angle limit mode, in which the possibility of the steering angles being restricted exists, is set, an intermittent noise is sounded from a small speaker 60 to let the driver know that the vehicle is set in the steering angle limit mode. Instead of alerting the driver with sound, a message such as "limit control in progress" may be brought up on the navigation screen 52. In addition, the driver may be alerted only when the steering angles are actually restricted, instead. Likewise, the driver may be alerted that the steering angle limit control is in progress by sounding a continuous noise through the small speaker 60. Alternatively, a message such as "limit control execution in progress" may the displayed on the navigation screen 52.

The vehicle explained above is provided with a mechanism which enables adjustment of the steering angles of the four wheels to be performed independently of one another. However, the present invention may be adopted in conjunction with a mechanism that is not capable of adjusting to the left and right steering angles independently of each other as well.

Second Embodiment

Figure 8:
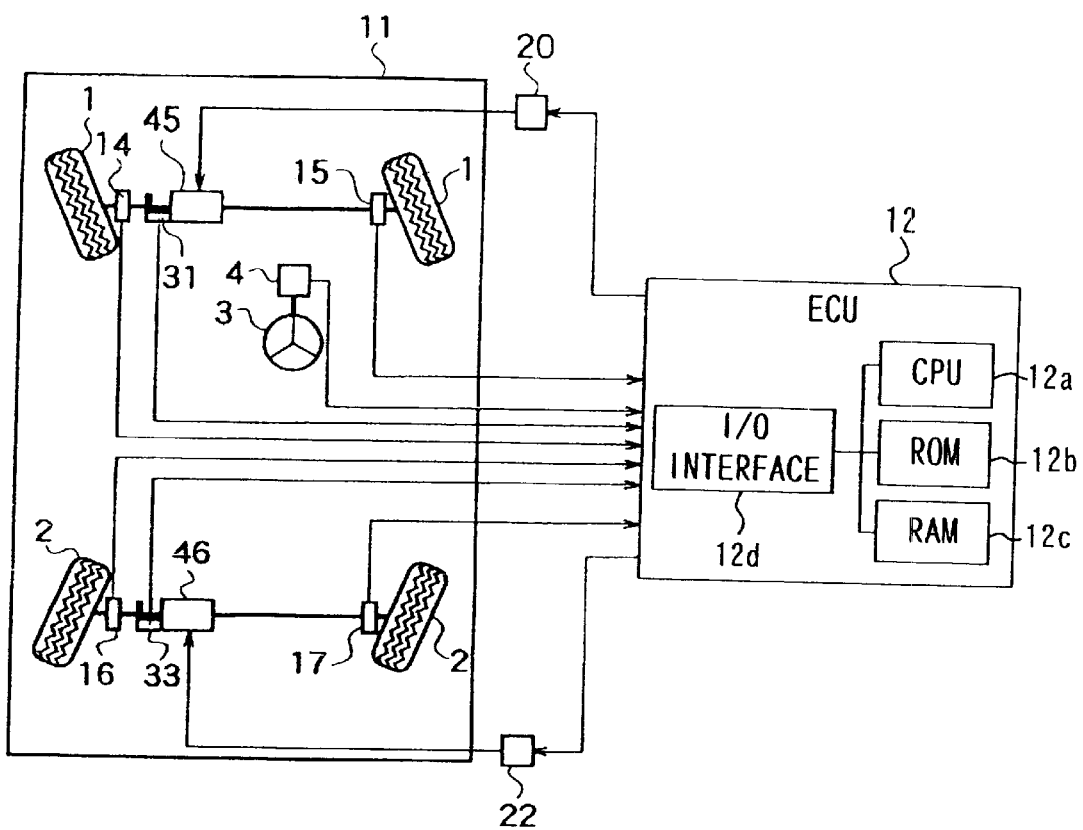
FIG. 8 is a system block diagram of a vehicle adopting the steering apparatus according to the present invention in a second embodiment.

FIG. 8 is a system configuration diagram of the second embodiment in which the present invention is adopted in a vehicle having a mechanism that is not capable of adjusting the left and right steering angles independently of each other both for the front wheels and the rear wheels.

In FIG. 8, a front wheel steering actuator 45 and a rear wheel steering actuator 46 each include a DC motor and are each capable of moving a steering rack along the lateral direction via a worm gear. Thus, the steering angles for the left wheel and the right wheel are simultaneously adjusted both at the front and the rear.

In the steering apparatus in the second embodiment, the ECU 12 calculates target steering angles by calculating target stroke quantities for the steering racks at the front and rear wheels. While the target values calculated by the ECU 12 are the stroke quantities corresponding to the steering angles instead of the steering angles themselves, no problem is posed in actual use by not directly calculating the steering angles. The stroke quantities of the steering racks corresponding to the front and rear wheels relative to the steering center are measured through testing and the data indicating the measurement results are stored in ROM in advance. The target stroke quantities (the front wheels STf*, the rear wheels STr*) for the front and rear wheels are calculated by looking up a table of the data stored in ROM. As explained earlier, it is even more desirable to store the front and rear wheel stroke quantities in correspondence to the vehicle speed as ROM data to be looked up in correspondence to the vehicle speed, as well.

Feedback control is implemented on the steering actuators 5~8 so as to match the stroke sensor detection values (the front wheels STf, the rear wheels STr) corresponding to the front and rear wheels with the target stroke quantities (the front wheels STf*, the rear wheels STr*) for the front and rear wheels. While the feedback control may be achieved through PID control, sliding mode control or model reference control, a detailed explanation of the method that may be adopted for the feedback control is omitted.

The present invention may be likewise adopted in a steering apparatus that is not capable of adjusting the left steering angle and the right steering angle independently of each other either for the front wheels or the rear wheels. For instance, the present invention may be adopted in a similar manner in a steering apparatus in which the front wheel steering angles are mechanically determined uniformly in conformance to the quantity of a steering operation performed by the driver and only the steering angles at the rear wheels can be adjusted independently of the steering operation quantity. In this case, a target steering angle calculating unit and a steering angle adjustment unit should be structured in conformance to the example of variation explained earlier, in correspondence to the type of the specific steering apparatus in which the present invention is adopted.

Figure 9A:
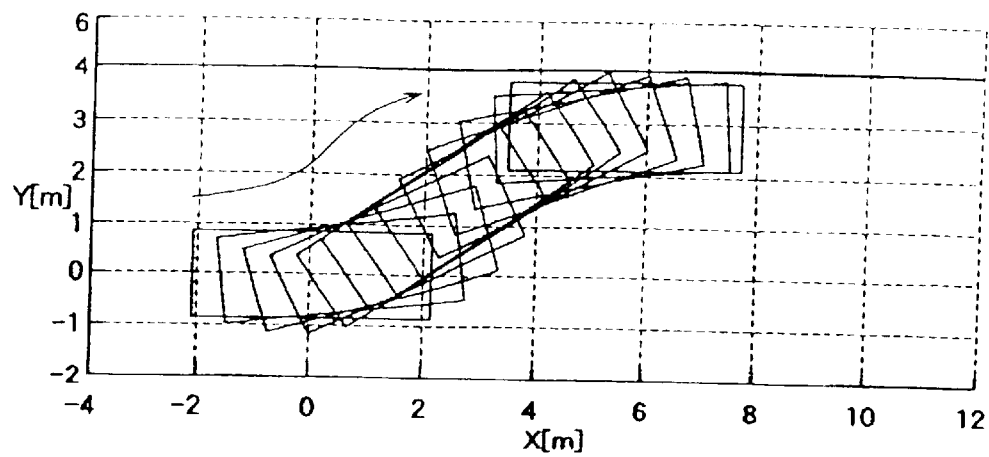
FIG. 9a illustrates the behavior of the vehicle employing the steering apparatus according to the present invention while the vehicle is being parallel parked.
Figure 9B:
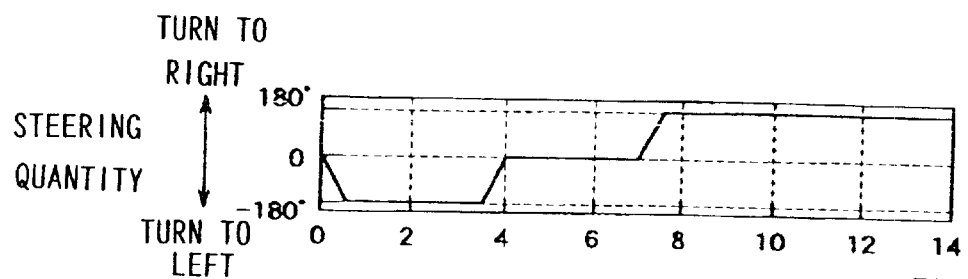
FIG. 9b shows the steering quantity achieved during the parallel parking operation and FIG. 9c shows the steering angle achieved during the parallel parking operation.
Figure 9C:
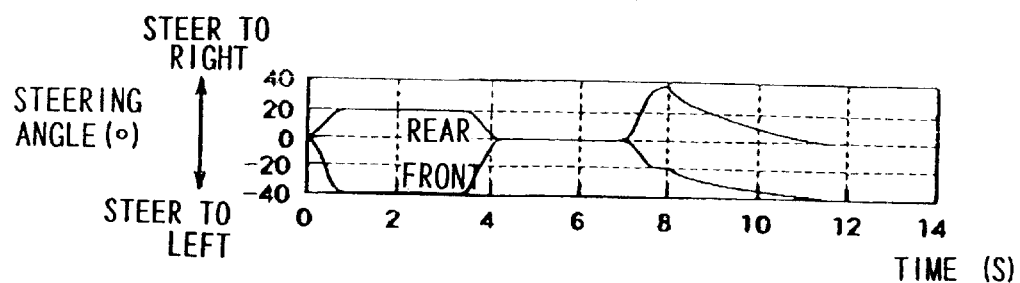
Figure 12:
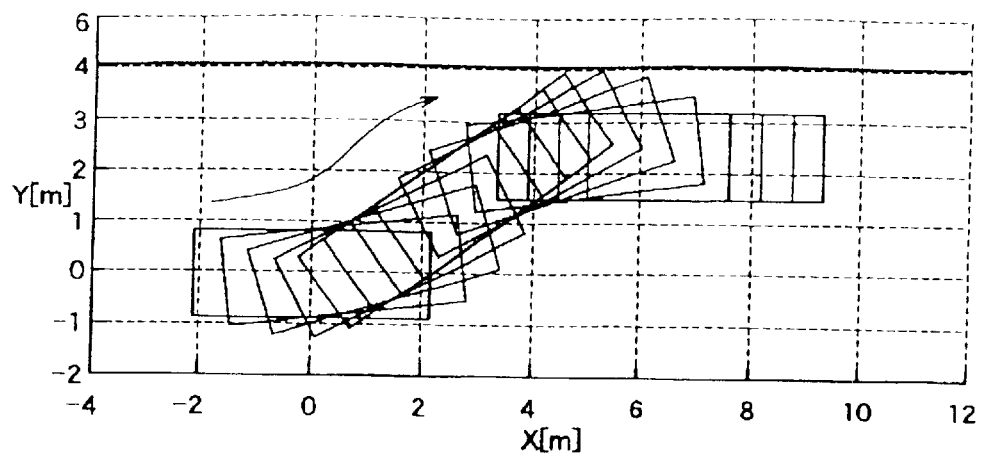
FIG. 12 illustrates the behavior of a vehicle adopting the related art technology while it is being parallel parked.
Figure 13:
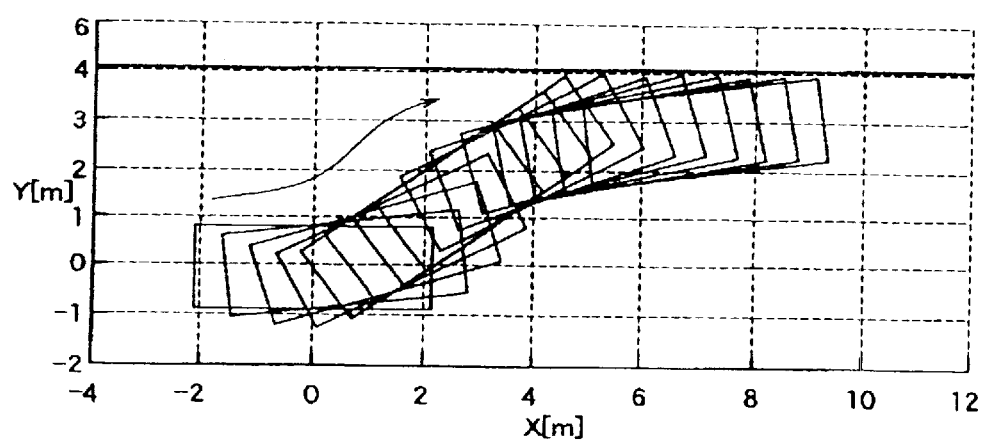
FIG. 13 illustrates the behavior of a vehicle adopting the related art technology while it is being parallel parked.

FIG. 9*a* presents an example of vehicular behavior observed when a vehicle equipped with the steering apparatus adopting the present invention is parallel parked. Compared to the related art examples shown in FIGS. 12 and 13, the vehicle can be parked in close proximity to, and parallel to the line Y=4 after traveling over a very short distance. The line Y=4 represents the boundary of the approach disallowed area. FIG. 9*b* shows the steering quantity and FIG. 9*c* shows the steering angles achieved during the parallel parking operation.

Figure 10A:
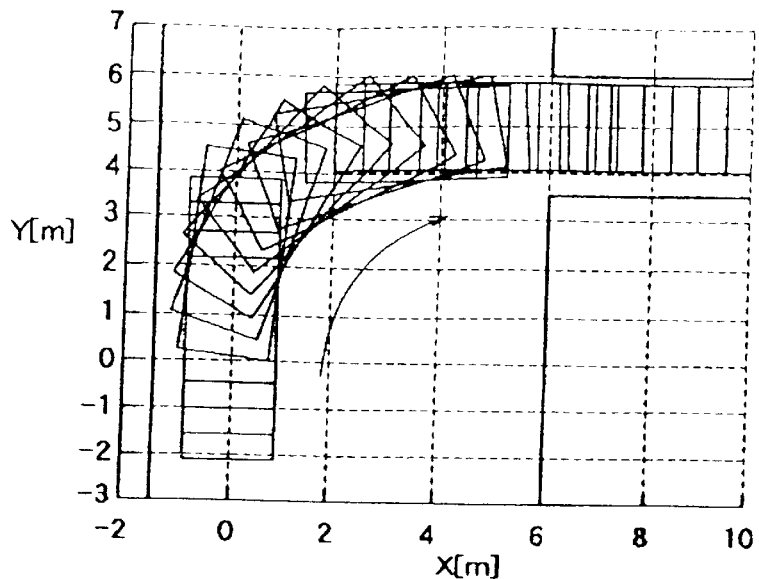
FIG. 10a illustrates the behavior of the vehicle employing the steering apparatus according to the present invention while the vehicle is entering a narrow passage.
Figure 10B:
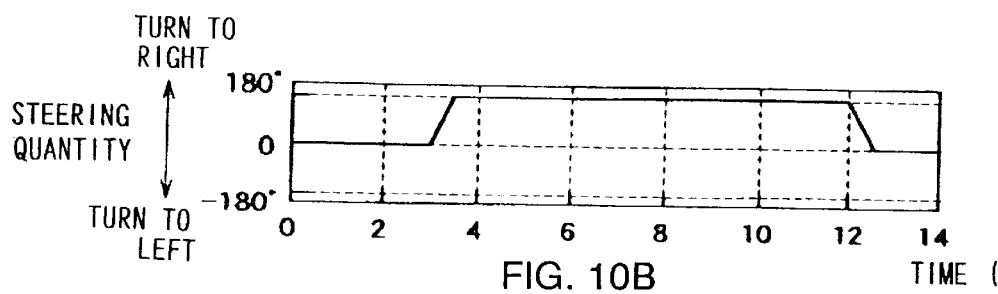
FIG. 10b shows the steering quantity achieved during the approach operation and FIG. 10c shows the steering angles achieved during the approach operation.
Figure 10C:
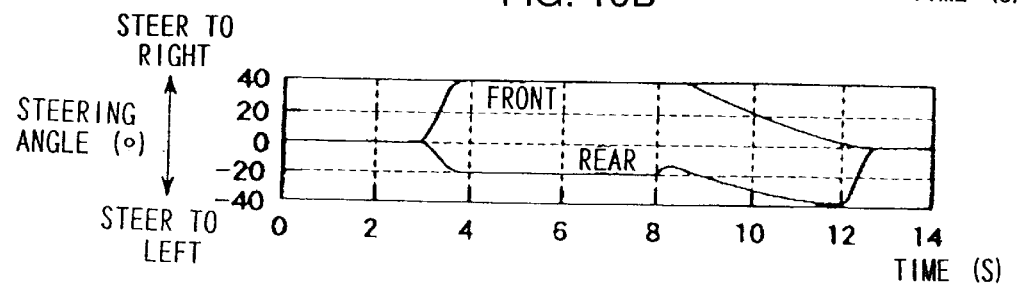
Figure 14:
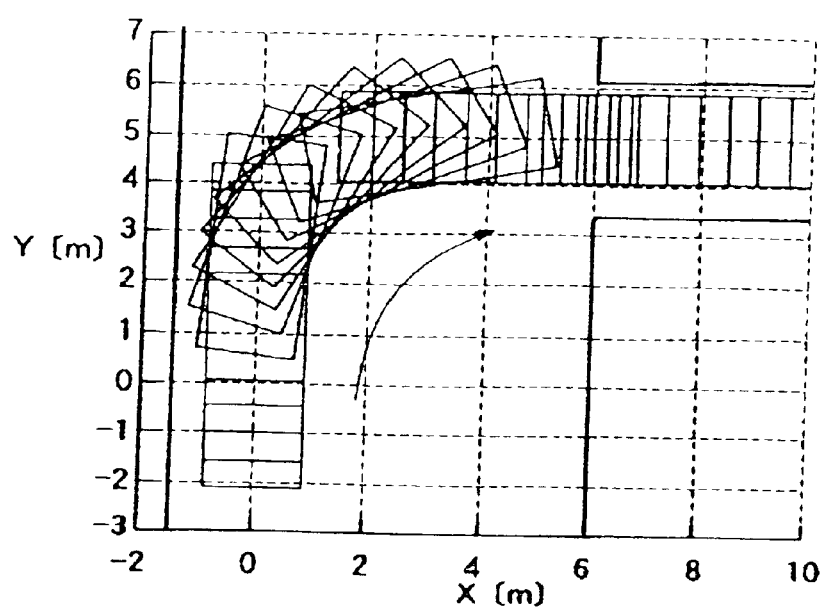
FIG. 14 illustrates the behavior of a vehicle adopting the related art technology when it is entering a narrow passage.

FIG. 10*a* shows an example of behavior of a vehicle equipped with the steering apparatus adopting the present invention entering a narrow passage. FIG. 10*b* shows the steering quantity and FIG. 10*c* shows the steering angles, both achieved during the approach into the narrow passage. Compared to the example of the related art shown in FIG. 14, the end point at the front left of the vehicle along the advancing direction does not swing out far beyond the narrow passage. In addition, since the vehicle attitude can be changed to orient the vehicle along a direction which allows the vehicle to enter the narrow passage with greater ease immediately before the vehicle makes an approach into the narrow passage, the driving operation is facilitated.

Advantages similar to those realized in the embodiments above are achieved when the present invention is adopted in a vehicle having a steering apparatus in which the front wheels and the steering wheel are mechanically connected, the front wheel steering angles are determined based upon the steering operation quantity and the rear wheel steering angles are calculated based upon the steering operation quantity as well. Namely, similar advantages are achieved by applying a steering reactive force to the steering wheel when an approach disallowed area is detected to prevent the steering from being operated beyond the current steering angle and set the steering angle for the rear wheels larger in correspondence to the level of the steering reactive force.

As explained above, according to the present invention, the steering angles at the front wheels are controlled so as to allow the front of the vehicle along the advancing direction to move roughly along the approach disallowed area boundary when the driver has performed a steering operation resulting in the absolute values of the target steering angles for the front of the vehicle along the advancing direction exceeding α. The rear wheels are steered in the reverse phase in relation to that of the front wheels of the vehicle along the advancing direction, for instance, to an extent corresponding to the steering angle. As a result, it becomes possible to change the vehicular behavior to allow the rear of the vehicle along the advancing direction to move closer to the approach disallowed area without causing the front of the vehicle along the advancing direction to move away from the approach disallowed area.

If the driver operates the steering wheel in such a manner that the absolute values of the target steering angles for the front of the vehicle along the advancing direction do not exceed a value substantially equal to α, i.e., if the driver operates the steering wheel to try to move the vehicle closer to the approach disallowed area, on the other hand, the vehicle is not subject to the restrictions imposed in the steering angle limit mode. Consequently, the vehicle moves toward the approach disallowed area and the distance between the vehicle and the approach disallowed area can be freely adjusted by the driver. The driver, therefore, can park the vehicle adopting the present invention as described above in parallel with ease.

When making an approach into a narrow passage, too, the vehicle can be set along the direction in which it can make a straight approach into the narrow passage by turning the steering wheel to a great extent while the outer side of the front of the vehicle is set slightly further into the narrow passage relative to the line extending from the left end of the entrance to the narrow passage (on the line Y=5.8 in FIG. 10, for instance). In addition, the distance between the boundary of the narrow passage and the vehicle can be adjusted through a steering operation performed by the driver. As a result, the driver can maneuver the vehicle into the narrow passage with ease.

The present invention is not limited to the examples presented in the embodiments explained above. For instance, the map data at the navigation device 51 may be utilized when calculating the values of DL, αL, DR and αR. Namely, the current vehicle position and the advancing direction are detected by using the GPS and the gyro sensor and, at the same time, the road on which the vehicle is traveling and the direction of the road are detected in correspondence to the point at which the vehicle is currently located and the node data corresponding to the current area (latitude/longitude information). The angles αR and αL can be calculated based upon the difference between the detected vehicle advancing direction and the direction of the road.

In addition, the values of DL, αL, DR and αR may be calculated by using the CCD camera 41 and the navigation system in conjunction with each other. Mainly, among edge lines detected by the CCD camera 41, only an edge line matching the orientation of the road obtained from the navigation system is used.

A distance sensor such as an ultrasonic sensor may be employed to make a judgment as to whether or not the steering angle limit mode has been cleared. In other words, the distance to an obstacle (a blocking wall or another vehicle) may be calculated based upon the detection value provided by the ultrasonic sensor installed at the rear of the vehicle to make a judgment that the limit mode has been cleared if the value thus calculated is equal to or greater than a predetermined value. A judgment that the steering angle limit mode has been cleared may be made when the steering quantity ST has decreased to almost 0.

A mode selector switch (for instance, a push button SW) may be provided to allow the driver to manually set or clear the steering angle limit mode. It is judged that the steering angle limit mode is set if the switch button is in an ON state, whereas it is judged that the steering angle limit mode has been cleared if the switch button is in an OFF state. By providing such a mode selector switch, the steering angle limit mode can be cleared in conformance to the state of the vehicle and the intention of the driver. The mode selector button may be substituted by a microphone and a voice recognition device. In such a case, when the device recognizes a specific word spoken by the driver, the operation is allowed to shift to the steering angle limit mode or the steering angle limit mode is cleared.

The driver may preregister a point at which the operation should be allowed to shift into the steering angle limit mode by checking the navigation screen 52. In this case, when the navigation device 51 detects that the vehicle has reached the pre-registered point, the operation is allowed to shift into the steering angle limit mode. The vehicle advancing direction may be used as a condition for shifting into the steering angle limit mode. For instance, the operation may be allowed to shift into the steering angle limit mode when the vehicle is traveling north, with a shift into the steering angle limit mode disallowed while the vehicle is traveling south. It becomes possible to preset the condition based upon the regional information in this manner.

Figure 4:
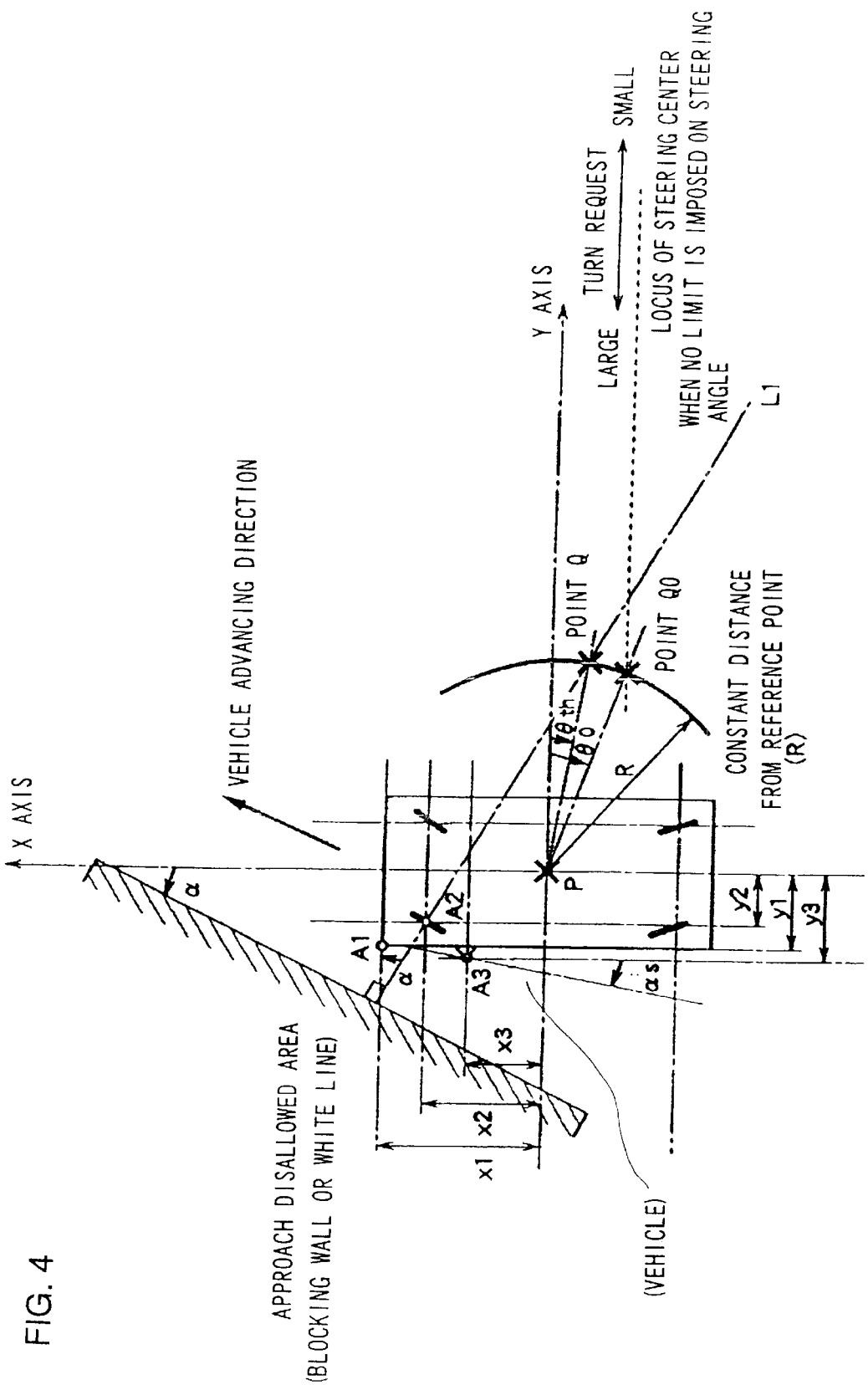
FIG. 4 illustrates how a front wheel steering angle limit is calculated.

When calculating the steering center elevation angle value θth, the outer end of the front of the turning vehicle along the advancing direction (A1 in FIG. 4) may be used, as well. In this case, a two-dimensional map MAP_A1 with regard to the point A1 in FIG. 4 is prepared based upon the values of x1, y1 and the like, as is the two-dimensional map MAP_A2 with regard to the point A2. Accordingly, the steering center elevation angle value θth corresponding to the map MAP_A1 should be calculated instead of the steering center elevation angle θth corresponding to the map MAP_A2. As a result, it becomes possible to control the vehicle with a high degree of accuracy so as to maneuver the outer end of the front of the vehicle in the advancing direction along a blocking wall or the like.

Furthermore, a portion of the vehicle (A3 in FIG. 4) which is in the closest proximity to the approach disallowed area boundary may be used to calculate the steering center elevation angle value θth. In this case, a two-dimensional map MAP_A1 with regard to the point A1 in FIG. 4 and a two-dimensional map MAP_A3 with regard to the point A3 in FIG. 4 are prepared based upon the values of x1, y1, x3, y3 and the like, as is the two-dimensional map MAP_A2 with regard to the point A2. If α>αs (the angle formed by the x axis and the line connecting the point A1 and the point A3: a positive value), the map MAP_A1 should be used but otherwise the map MAP_A3 should be used, to calculate the steering center elevation angle value θth. As a result, it becomes possible to control the vehicle with a high degree of accuracy even when the side mirror of the vehicle projects further outward relative to the outer end at the front of the vehicle along the advancing direction.

Alternatively, a map MAP_A13 which is achieved by incorporating the map MAP_A1 and the map MAP_A3 may be prepared, to ascertain the steering center elevation angle value θth by using a look-up table of the α value and the reciprocal of the target steering center radius R. When this structure is adopted, the values corresponding to the map MAP_A1 are stored over the range α>αs and the values corresponding to the mat MAP_A13 are stored for the range other than the above, as the data for the map MAP_A13.

The disclosure of the following priority application is herein incorporated by reference: Japanese Patent Application No. 2000-297313 filed Sep. 28, 2000.

What is claimed is:

1. A vehicle steering apparatus comprising;
   an approach disallowed area detection device that detects an approach disallowed area present toward an outer side of a turning vehicle relative to a direction in which the vehicle advances;
   an α calculating device that performs an arithmetic operation to calculate an angle α formed by an orientation of a boundary of the approach disallowed area detected by said approach disallowed area detection device and an orientation of the vehicle; and
   a steering angle control device that imposes a limit on a steering angle for wheels at a front side of the vehicle so that the front steering angle does not exceed a predetermined value equal to or smaller than α while implementing control on a rear steering angle for wheels at a rear side of the vehicle if the front steering angle exceeds the angle α calculated by said α calculating device.

2. A vehicle steering apparatus according to claim 1, wherein;
the predetermined value is α.

3. A vehicle steering apparatus according to claim 1, wherein;
the predetermined value represents an angle formed by a line passing through an outer end of the turning vehicle along the advancing direction and extending perpendicular to the orientation of the approached disallowed area boundary and a line connecting a front (rear) left wheel and a front (rear) right wheel.

4. A vehicle steering apparatus according to claim 1, wherein;
the predetermined value represents an angle formed by a line passing through a portion of the vehicle set closest to the approach disallowed area boundary and extending perpendicular to the orientation of the approached disallowed area boundary and a line connecting a front (rear) left wheel and a front (rear) right wheel.

5. A vehicle steering apparatus according to claim 1, wherein;
said steering angle control device implements control on the rear steering angle along a direction in which a turning radius becomes smaller, as an extent to which the front steering angle exceeds the predetermined value increases.

6. A vehicle steering apparatus according to claim 1, wherein;
said steering angle control device implements control on the rear steering angle so as to achieve a turning radius equal to a turning radius realized when no limit is imposed on the front steering angle, if a limit is imposed on the front steering angle.

7. A vehicle steering apparatus according to claim 1, wherein;
said steering angle control device includes;
a front steering angle calculating device that calculates a front steering angle for wheels at a front side of the vehicle; and
a rear steering angle calculating device that calculates a rear steering angle for wheels at a rear side of the vehicle; and
said steering angle control device imposes a limit on the front steering angle calculated by said front steering angle calculating device so that the front steering angle does not exceed the predetermined value equal to or smaller than α while implementing control on the rear steering angle calculated by said rear steering angle calculating device, if the front steering angle calculated by said front steering angle calculating device exceeds the angle α calculated by said α calculating device.

8. A vehicle steering apparatus according to claim 1, wherein;
said steering angle control device implements reverse phase control on a rear wheel at a steering angle value set at half of the front wheel steering angle if no limit is imposed on the front steering angle, whereas said steering angle control device implements reverse phase control on the rear wheel with the steering angle value set at (1+α) times half of the steering angle at the front wheel when a limit is imposed on the front steering angle.

9. A vehicle steering apparatus according to claim 1, wherein;
said approach disallowed area detection device includes a position detection unit that detects a vehicle position, an advancing direction detection unit that detects a direction in which the vehicle is advancing and a storage unit in which road information is stored, and detects the approach disallowed area boundary present toward the outer side of the turning vehicle relative to a direction in which the vehicle is advancing, based upon the current vehicle position and the advancing direction that have been detected and the road information read out from said storage unit.

10. A vehicle steering apparatus according to claim 1, further comprising;
a vehicle speed detection device that detects a vehicle traveling speed, wherein;
said steering angle control device does not impose any limit on the front steering angle if the vehicle speed detected by said vehicle speed detection device is equal to or higher than a predetermined vehicle speed.

11. A vehicle steering apparatus according to claim 1, further comprising;
a limit input device that is operated by a driver, wherein;
said steering angle control device imposes a limit on the front steering angle so that the front steering angle does not exceed the predetermined value equal to or smaller than α while implementing control on the rear steering angle, if an operation to impose a limit on the front steering angle is performed through said limit input device and an approach disallowed area is detected by said approach disallowed area detection device.

12. A vehicle steering apparatus according to claim 1, further comprising;
a current position detection device that detects a current position of the vehicle; and
a point setting judging device that makes a judgment as to whether or not the current vehicle position detected by said current position detection device is at a preset point, wherein;
said steering angle control device imposes a limit on the front steering angle so that the front steering angle does not exceed a predetermined value equal to or smaller than α while implementing control on the rear steering angle if it is judged by said point setting judging device that the current position of the vehicle is at the preset point.

13. A vehicle steering apparatus according claim 1, further comprising;
a steering operation quantity detection device that detects a quantity of operation performed at a steering wheel, wherein;
said steering angle control device clears a limit on the front steering angle once the steering operation quantity detected by said steering operation quantity detection device is substantially at 0 after the limit has been imposed on the front steering angle so that the front steering angle does not exceed the predetermined value equal to or smaller than α.

14. A vehicle steering apparatus according to claim 1, further comprising;
an alerting device that alerts the driver if a limit is imposed by said steering angle control device on the front steering angle so that the front steering angle does not exceed the predetermined value equal to or smaller than α.

15. A vehicle steering apparatus comprising;
an approach disallowed area detection means for detecting an approach disallowed area present toward an outer side of a turning vehicle relative to a direction in which the vehicle is advancing;

an $\alpha$ calculation means for calculating an angle $\alpha$ formed by an orientation of a boundary of the approach disallowed area detected by said approach disallowed area detecting means and an orientation of the vehicle and;

a steering angle control means for imposing a limit on a front steering angle for wheels at a front side of the vehicle so that the front steering angle does not exceed a predetermined value equal to or smaller than $\alpha$ while implementing control on a rear steering angle for wheels at the rear side of the vehicle if the front steering angle exceeds the angle $\alpha$ calculated by said $\alpha$ calculating means.

16. A vehicle steering method comprising steps of;

detecting an approach disallowed area present toward an outer side of a turning vehicle relative to a direction in which the vehicle is advancing;

calculating an angle $\alpha$ formed by an orientation of a boundary of the approach disallowed area thus detected and an orientation of the vehicle; and imposing a limit on a front steering angle for wheels at the front side of the vehicle so that the front steering angle does not exceed a predetermined value equal to or smaller than a while implementing control on a rear steering angle for wheels at the rear side of the vehicle if the front steering angle exceeds the angle a that has been calculated.

* * * * *